(12) United States Patent
Chikamori et al.

(10) Patent No.: US 7,799,425 B2
(45) Date of Patent: Sep. 21, 2010

(54) COMPOSITE NANOPARTICLES METHOD FOR PRODUCING THE SAME

(75) Inventors: Yusuke Chikamori, Tokyo (JP); Naoaki Ogure, Tokyo (JP)

(73) Assignee: Ebara Corporation, Tokyo (JP)

( * ) Notice: Subject to any disclaimer, the term of this patent is extended or adjusted under 35 U.S.C. 154(b) by 573 days.

(21) Appl. No.: 10/587,335

(22) PCT Filed: Feb. 4, 2005

(86) PCT No.: PCT/JP2005/002098

§ 371 (c)(1),
(2), (4) Date: Jul. 26, 2006

(87) PCT Pub. No.: WO2005/075132

PCT Pub. Date: Aug. 18, 2005

(65) Prior Publication Data

US 2007/0160837 A1    Jul. 12, 2007

(30) Foreign Application Priority Data

Feb. 4, 2004  (JP) .............................. 2004-028699

(51) Int. Cl.
*B32B 5/16* (2006.01)
(52) U.S. Cl. .................... 428/403; 977/773; 977/830
(58) Field of Classification Search ............... 428/403, 428/407; 977/773, 830; 427/212
See application file for complete search history.

(56) References Cited

U.S. PATENT DOCUMENTS 6,262,129 B1 * 7/2001 Murray et al. ............... 516/33
6,369,206 B1 * 4/2002 Leone et al. .............. 530/391.5
6,649,138 B2 * 11/2003 Adams et al. ................ 423/403
6,730,400 B1   5/2004 Komatsu et al.

(Continued)

FOREIGN PATENT DOCUMENTS

| EP | 1 199 123 | 4/2002 |
|---|---|---|
| JP | 03-264610 | 11/1991 |
| JP | 2000-015097 | 1/2000 |
| JP | 2000-024619 | 1/2000 |
| WO | 01/70435 | 9/2001 |

OTHER PUBLICATIONS

Supplementary European Search Report issued Jun. 18, 2009 in connection with EP 05 71 0150 corresponding to the present U.S. application.

(Continued)

*Primary Examiner*—H. (Holly) T Le
(74) *Attorney, Agent, or Firm*—Wenderoth, Lind & Ponack, L.L.P.

(57) ABSTRACT

A composite nanoparticle makes it possible to significantly lower the temperature to separate an organic substance from a core and uniformly sinter the cores, and can be applied to bonding that replaces soldering. The composite nanoparticle includes a metal component as a core, and an organic substance surrounding the metal component and bonded to it by physical adsorption. The composite nanoparticles can be produced by allowing an inorganic metal salt and an organic material to coexist, and heating the inorganic metal salt and the organic material to a predetermined temperature and holding them at the temperature for a predetermined time so that the inorganic metal salt is decomposed to produce metal nanoparticles. Thus, an organic substance is bonded to the metal nanoparticles by physical adsorption without forming an organometallic compound through a reaction between the metal nanoparticles and the organic substance.

13 Claims, 11 Drawing Sheets

U.S. PATENT DOCUMENTS

| | | | |
|---|---|---|---|
| 6,743,395 B2* | 6/2004 | Fukunaga et al. | 419/23 |
| 6,787,500 B2 | 9/2004 | Ito et al. | |
| 6,860,924 B2* | 3/2005 | Rajagopalan et al. | 96/154 |
| 6,871,773 B2* | 3/2005 | Fukunaga et al. | 228/122.1 |
| 6,946,785 B2 | 9/2005 | Ito et al. | |
| 7,175,909 B2* | 2/2007 | Hu et al. | 428/402 |
| 7,318,957 B2* | 1/2008 | Sato et al. | 428/403 |
| 7,361,410 B2* | 4/2008 | Zhang et al. | 428/551 |
| 2002/0018896 A1 | 2/2002 | Fukunaga et al. | |
| 2003/0039860 A1* | 2/2003 | Cheon et al. | 428/694 T |
| 2005/0065026 A1 | 3/2005 | Okubo | |
| 2005/0191491 A1* | 9/2005 | Wang et al. | 428/407 |
| 2006/0157677 A1* | 7/2006 | Kunze et al. | 252/500 |

OTHER PUBLICATIONS

Guo, Q. et al., Patterned Langmuir—Blodgett Films of Monodisperse Nanoparticles of Iron Oxide Using Soft Lithography, *Journal of American Chemical Society*, vol. 125 (2003), pp. 630-631.

Ohno, K. et al., Synthesis of Gold Nanoparticles Coated with Well-Defined, High-Density Polymer Brushes by Surface-Initiated Living Radical Polymerization, *Macromolecules*, vol. 35 (2002), pp. 8989-8993.

Morrison, Boyd, *Organic Chemistry*, London, Prentice Hall International, Jan. 17, 1992. p. 216.

* cited by examiner

COMPOSITE NANOPARTICLES METHOD FOR PRODUCING THE SAME

TECHNICAL FIELD

The present invention relates to composite nanoparticles (composite metal nanoparticles or composite inorganic metal compound nanoparticles) and a method for producing the composite nanoparticles, and more particularly to composite nanoparticles, which can be used as a base material of a bonding material, e.g., for bonding between electrodes of a semiconductor device, and a method for producing the composite nanoparticles.

BACKGROUND ART

In association with the trend toward smaller-sized semiconductor devices and electrical/electronic components, metal particles having a particle diameter of not more than 100 nm, so-called metal nanoparticles, have attracted attention for their applicability to semiconductor devices, etc. Examples of the application of metal nanoparticles to semiconductor devices, etc. include the formation of interconnects with a small amount of a liquid containing metal nanoparticles and the use of a conductive paste containing metal nanoparticles, for example.

Sn—Pb solders, which have been widely used for bonding of various devices to a substrate in a semiconductor device mounting process, for bonding between electrodes of a high-power semiconductor device, etc., are required to be replaced with lead-free solders from the viewpoint of environmental conservation. A technique is almost established to replace a low-temperature solder, such as a common 60% Sn-40% Pb solder, of Sn—Pb solders chiefly with a lead-free Sn—Ag—Cu solder. For a Sn-95% Pb high-temperature solder having a melting point of about 300° C., however, there is at present no prospect of a substitute solder material of lead-free composition. It would therefore be very advantageous if the use of Sn-95% Pb high-temperature solder could be abolished totally by replacing the high-temperature solder with a bonding material comprising as a base material composite nanoparticles each composed of a metal nanoparticle or an inorganic metal compound nanoparticle as a core, and carrying out bonding based on the low-temperature sintering property of the nanoparticles.

Metal nanoparticles are known to generally take on properties different from the bulk metal material as the particle diameter decreases. This is considered to be due to the fact that the proportion of the atoms exposed on a surface of a metal nanoparticle to all atoms contained in the nanoparticle is much higher compared to the bulk metal. One of typical properties of metal nanoparticles is a temperature at which sintering occurs. Table 1 shows sintering initiation temperatures of various types of metal nanoparticles having a particle size of about 20 to 50 nm (see Ichinose, Ozaki and Gasyu, "Approach to Ultrafine Particle Technology", Ohmsha, Ltd., July 1988).

TABLE 1

| Metal | Diameter (nm) | Sintering initiation temp. (° C.) |
|---|---|---|
| Fe | 50 | 300-400 |
| Ag | 20 | 60-80 |
| Ni | 20 | -200 |
| Cu |  | 200 |

As is apparent from Table 1, metal nanoparticles initiate sintering at remarkably lower temperatures as compared to particles commonly used industrially. There is a strong likelihood that by utilizing such low-temperature sintering property of metal nanoparticles and applying metal nanoparticles to low-temperature bonding of members, metal nanoparticles will replace lead-containing solders commonly used as a bonding material for electric components, semiconductor devices, etc.

On the other hand, metal nanoparticles generally have a very high surface activity and, therefore, tend to attract each other, so that the particles get closer to each other and agglomerate even at room temperature. Once metal nanoparticles agglomerate into coarse particles, the unique properties of nanoparticles are instantly lost. For this reason, it has generally been considered difficult to apply metal nanoparticles to, for example, the formation of fine interconnects or filling-in of vias of very small size in a semiconductor.

In view of this, composite metal nanoparticles, in which each metal nanoparticle is covered with a coating of an organic substance to protect the metal nanoparticle, have been developed. The following two methods are generally known to coat and protect a surface of a metal nanoparticle with an organic substance: (1) a method of forming a solvent coating film on a surface of each metal nanoparticle in the course of the formation of the metal nanoparticle by a physical means and before the particles collide with each other to agglomerate; and (2) a method of allowing a solvent, a metal salt, a protective agent, a reducing agent, etc. to coexist in a liquid-phase system, and heating the system.

The method (1), which involves the formation of metal nanoparticles by a physical means, necessitates vaporization of a starting metal principally in a gas, which is likely to lead to a low-productivity costly process. The liquid-phase method (2), which involves the formation of composite metal nanoparticles with a liquefied starting material for the particles under atmospheric pressure, is advantageous over the method (1) in that a low-cost mass productive process can be easily established.

A method belonging to the method (2) has been proposed which comprises heating a starting material, for example, silver stearate at 250° C. in a nitrogen gas atmosphere to produce composite silver nanoparticles (see, for example, Japanese Patent Laid-Open Publication No. H10-183207). This method can produce a composite silver nanoparticle 20, as shown in FIG. 1, comprising a metal core 22 of a metal (silver) component, having an average particle diameter $d_2$ of, e.g., about 5 nm, and a coating of an organic substance 24, having a thickness $h_2$ of, e.g., about 1.5 nm. It has been confirmed that a temperature of at least 250° C. is necessary to separate the organic substance 24' from the surface of the metal core 22 (metal component) of the composite silver nanoparticle 20 and uniformly sinter the metal cores 22, and that the bonding temperature of a bonding material comprising the composite silver nanoparticles 20 as a base material is also at least 250° C. It is considered in this regard that the organic substance 24 is chemically bonded to the surface of the metal core 22, that is, an organometallic compound with the metal (silver) taken in has been formed by a reaction between the organic substance 24 and the metal core 22, and therefore the bonding energy is so high that the high temperature (energy) is necessary to release the bonding and separate the organic substance 24 from the metal core 22.

It has also been proposed to produce composite silver nanoparticles by allowing a metal salt and an alcoholic organic material to coexist, and heating the mixture at a temperature equal to or higher than the decomposition initiation temperature of the alcoholic organic material (see, for example, International Publication WO 01/70435 Pamphlet). This method can produce a composite silver nanoparticle comprising a metal core of a metal (silver) component, having an average particle diameter of, e.g., about 7 to 10 nm, and a coating of an organic substance, having a thickness of, e.g., about 1.5 nm. It has been confirmed that, as with the above-described composite silver nanoparticles, a temperature of at least 250° C. is necessary to separate the organic substance from the surface of the metal core of this composite silver nanoparticle and uniformly sinter the metal cores, and that the bonding temperature of a bonding material comprising the composite silver nanoparticles as a base material is also at least 250° C. This is considered to be due to chemical bonding of the organic substance to the metal core through the formation of an organometallic compound as in the above-described case.

SUMMARY OF THE INVENTION

With respect to the conventional composite metal nanoparticles, a temperature of at least about 250° C. is necessary to separate an organic substance from a metal core in each particle and uniformly sinter the metal cores, and the bonding temperature of a bonding material comprising the composite metal nanoparticles as a base material is also at least about 250° C. Therefore, in view of the present situation that the heating temperature (bonding temperature) necessary for solder bonding commonly used for semiconductor devices, electric components, etc. is around 200° C., the bonding temperature of a bonding material comprising the conventional composite metal nanoparticles as a base material is too high.

The present invention has been made in view of the above situation. It is therefore an object of the present invention to provide a composite nanoparticle which makes it possible to significantly lower the temperature to separate an organic substance from a metal core and uniformly sinter the metal cores or significantly lower the temperature to separate an organic substance from a core comprising an inorganic metal compound and metallize the cores, and which can be applied to a bonding method that replaces solder bonding, and to provide a method for producing the composite nanoparticle.

Thus, the present invention provides a composite nanoparticle comprising a metal component as a core, and an organic substance surrounding the metal component and bonded to the metal component by physical adsorption.

In such a structure that a metal component as a core (metal core) is surrounded by an organic substance which is bonded to the metal component by physical adsorption, the organic substance is loosely bonded to a surface of the metal component, as is distinct from chemical bonding. Thus, the organic substance can be separated from the surface of the metal component (metal core) at a much lower temperature and with a lower energy as compared to the conventional composite metal nanoparticle in which an organic substance is chemically and strongly bonded to a metal component (metal core) through the formation of an organometallic compound.

The present invention provides another composite nanoparticle comprising a metal component as a core, and an organic substance surrounding the metal component and having a thermal separation initiation temperature of not less than 140° C. and less than 190° C.

By thus making the thermal separation initiation temperature of the organic substance, i.e., the temperature necessary for separating the organic substance surrounding the core metal component from the metal component, not less than 140° C. and less than 190° C., the bonding temperature of a bonding material, comprising the composite nanoparticles (composite metal nanoparticles) as a base material, can be made around 200° C. Accordingly, solder bonding at a heating temperature (bonding temperature) of around 200° C., commonly used for semiconductor devices, electric components, etc., can be replaced with bonding utilizing the composite nanoparticles.

The present invention also provides yet another composite nanoparticle comprising a metal component as a core, and an organic substance surrounding the metal component and having a separation energy of not more than 0.3 eV per metal atom.

By thus making the separation energy of the organic substance, i.e., the energy necessary for separating the organic substance surrounding the core metal component from the metal component, not more than 0.3 eV per metal atom, the organic substance can be separated from the surface of the metal component (metal core) with a much lower energy as compared to the conventional composite metal nanoparticle in which an organic substance is chemically bonded to a metal component (metal core) through the formation of an organometallic compound.

Preferably, the organic substance consists only of carbon, hydrogen and oxygen.

When the organic substance of the composite nanoparticle contains an element other than carbon (C), hydrogen (H) and oxygen (O), such as nitrogen (N) or sulfur (S), the N or S component of the organic substance will remain in the sintered metal, produced by sintering of the metal cores, after separation of the organic substance from the metal component. The remaining element can adversely affect the conducting properties, etc. of the sintered metal. A composite nanoparticle not containing N or S in the organic substance naturally does not leave N or S in the sintered metal after separation of the organic substance and is free from the adverse effects of remaining N or S, such as lowering of the electric conductivity.

The metal component may comprise at least one of Cu, Ag, Pt, Pd, Ni, Au, Ru, and Rh.

Preferably, the content of the metal component is 50 to 99% by weight of the total.

Preferably, the average particle diameter of the core is 1 to 100 nm.

A thickness of an organic coating is basically the same for various diameters of the core (metal component) of a composite nanoparticle. Thus, the weight ratio between the metal component and the organic substance in a composite nanoparticle varies with the diameter of the metal component. If the diameter of the metal component is too small, because of the increased proportion of the organic substance, it is difficult to quickly separate the organic substance from the metal component in carrying out sintering. If the diameter of the metal component is too large, on the other hand, the unique characteristics of metal nanoparticles will be instantly lost. Therefore, it becomes difficult to maintain the low-temperature sintering property, for example, which is essential for bonding. The sintering initiation temperature of metal particles is known to decrease with a decrease in the particle diameter when the particle diameter is not more than 100 nm. The lowering of sintering initiation temperature is marked when the particle diameter is not more than 20 nm, and is remarkable when the particle diameter is not more than 10 nm. From an applicative viewpoint, therefore, the average particle diameter of the core (metal component) is preferably 1 to 20 nm, especially preferably 5 to 15 nm.

The present invention provides yet another composite nanoparticle comprising a core and a coating of an organic substance bonded to the core by physical adsorption. The core comprising at least an inorganic metal compound.

A conventional metal nanoparticle, as it is or in the bare state, is highly active chemically and therefore needs to be stabilized by covering it with an organic substance. The composite nanoparticle (composite inorganic metal compound nanoparticle) of the present invention contains in the core an inorganic metal compound which thermally decomposes at a relatively low temperature, and is stable by covering of the core with an organic substance with such a weak bonding force as physical adsorption. Therefore, the present composite nanoparticles can be metallized at about 200° C. which is lower than the metallization temperature of conventional composite metal nanoparticles.

Preferably, the organic substance consists only of carbon, hydrogen and oxygen. It is sufficient for the organic substance to cover the core containing an inorganic metal compound with such a weak bonding force as physical adsorption. Accordingly, the organic substance need not have a functional group containing an element, such as nitrogen or sulfur, which has a strong bonding power to a metal element. In the case of using the organic substance consisting only of carbon, hydrogen and oxygen, there is no fear of nitrogen or sulfur remaining in the metal after metallizing the inorganic metal compound.

Preferably, the inorganic metal compound is an inorganic compound of a metal comprising at least one of Cu, Ag, Pt, Pd, Ni, Au, Ru, and Rh. The metal may comprise either one of these metal elements or a mixture of two or more. Though the inorganic metal compound may be in any form insofar as it thermally decomposes at a low temperature, it is preferred to use a carbonate, an oxide, or the like, which will not cause the problem of residual component upon decomposition.

The present invention also provides a method for producing composite nanoparticles comprising: allowing an inorganic metal salt and an organic material to coexist; and heating the inorganic metal salt and the organic material to a predetermined temperature and holding them at the temperature for a predetermined time so that the inorganic metal salt is decomposed to produce metal nanoparticles and an organic substance is bonded to the metal nanoparticles by physical adsorption without forming an organometallic compound through a reaction between the metal nanoparticles and the organic substance.

By thus allowing an inorganic metal salt and an organic material to coexist, and heating the inorganic metal salt and the organic material to a predetermined temperature and holding them at the temperature for a predetermined time, composite nanoparticles (composite metal nanoparticles) can be produced. Each particle comprises a metal component as a core (metal core) and an organic substance surrounding the metal component and bonded to the metal component by physical adsorption, not by chemical bonding.

The present invention provides another method for producing composite nanoparticles comprising: allowing an inorganic metal salt and an organic material to coexist; and heating the inorganic metal salt and the organic material to a predetermined temperature and holding them at the temperature for a predetermined time so that an organic substance is bonded by physical adsorption to cores, comprising an inorganic metal compound produced by the inorganic metal salt or thermal decomposition of the inorganic metal salt, without forming an organometallic compound through a reaction between the organic substance and at least part of the inorganic metal salt.

By thus allowing an inorganic metal salt and an organic material to coexist, and heating the inorganic metal salt and the organic material to a predetermined temperature and holding them at the temperature for a predetermined time, composite nanoparticles (composite inorganic metal compound nanoparticles) can be produced. Each particle comprises a core, comprising at least an inorganic metal compound, and an organic substance surrounding the core and bonded to the core by physical adsorption, not by chemical bonding.

In a preferred aspect of the present invention, the following formula (1) holds true, with T (° C.) representing the heating temperature of the inorganic metal salt and the organic material and t (h) representing the holding time at the temperature:

$$(T+273)(20+\log t) \times 10^{-3} \leq 7.98 \qquad (1)$$

Preferably, the inorganic metal salt is silver carbonate and the organic material is a higher alcohol.

Preferably, the higher alcohol is myristyl alcohol and the heating temperature is not less than 70° C. and less than 140° C.

By thus heating and holding, for example, silver carbonate (inorganic metal salt) and myristyl alcohol (organic material) at a temperature of not less than 70° C. and less than 140° C. for a predetermined time, for example, at 120° C. for 2 hours, composite nanoparticles in which an organic substance is bonded to a metal component (silver) or an inorganic metal compound (silver carbonate) by physical adsorption without chemical bonding, can be produced. In case silver carbonate (inorganic metal salt) and myristyl alcohol (organic material) are heated and held at 140° C., exceeding the upper limit of the above temperature range, for two hours, an organic substance will react with a metal component (silver) or an inorganic metal compound (silver carbonate) to form an organometallic compound, producing composite nanoparticles in which the organic substance is chemically and strongly bonded to the metal component or the inorganic metal compound through the formation of the organometallic compound.

The present invention also provides yet another composite nanoparticle produced by allowing an inorganic metal salt and an organic material to coexist, and heating and holding them in such a manner that the following formula (2) holds true, with T (° C.) representing the heating temperature and t (h) representing the holding time at that temperature:

$$(T+273)(20+\log t) \times 10^{-3} \leq 7.98 \qquad (2)$$

According to the composite nanoparticles of the present invention, the organic substance, surrounding and protecting the core (metal component and/or inorganic metal compound), is loosely bonded to the surface of the core by physical adsorption, as distinct from strong chemical bonding. Accordingly, the organic substance can be separated from the core at a much lower heating temperature, e.g., not less than 140° C. and less than 190° C., as compared to the conventional composite metal nanoparticles in which an organic substance is chemically bonded to a metal component (metal core). This makes it possible to replace solder bonding at a heating temperature (bonding temperature) of around 200° C., commonly used for semiconductor devices, electrical components, etc., with bonding utilizing the present composite nanoparticles.

DETAILED DESCRIPTION OF THE INVENTION

Preferred embodiments of the present invention will now be described with reference to the drawings.

Figure 2:
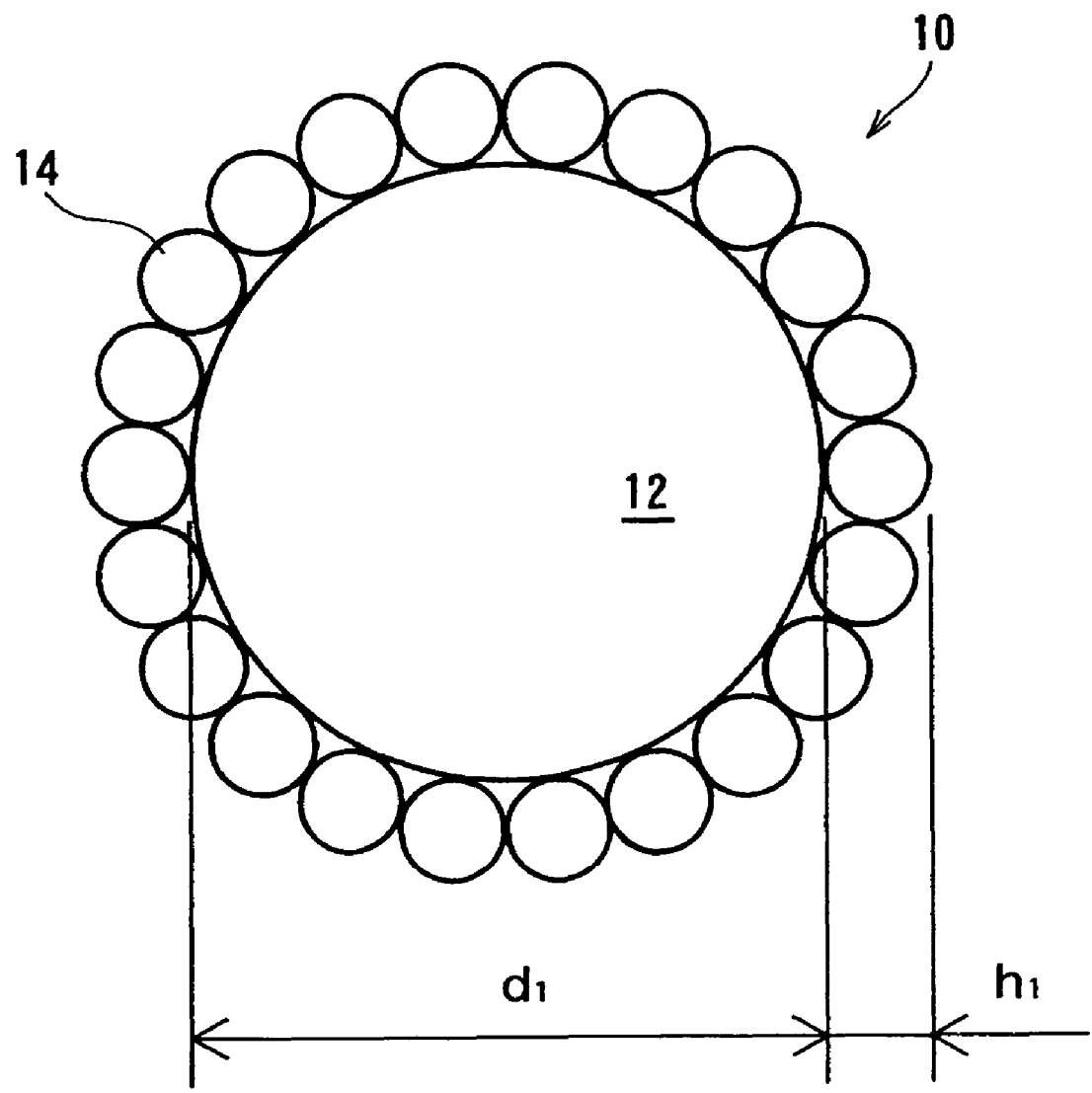
FIG. 2 is a diagram schematically illustrating a composite nanoparticle (composite metal nanoparticle) according to an embodiment of the present invention.

FIG. 2 schematically shows a composite nanoparticle (composite metal nanoparticle) according to an embodiment of the present invention. As shown in FIG. 2, the composite nanoparticle 10 comprises a metal component (metal core) 12 as a core, and an organic substance 14 surrounding the metal component 12 and bonded to the metal component 12 by physical adsorption. The organic substance 14 functions as a protective coating for the metal component 12. Owing to the organic substrate 14 covering the metal component 12, the composite metal nanoparticles 10 have excellent dispersion stability with little tendency of the metal components 12 to agglomerate.

Figure 1:
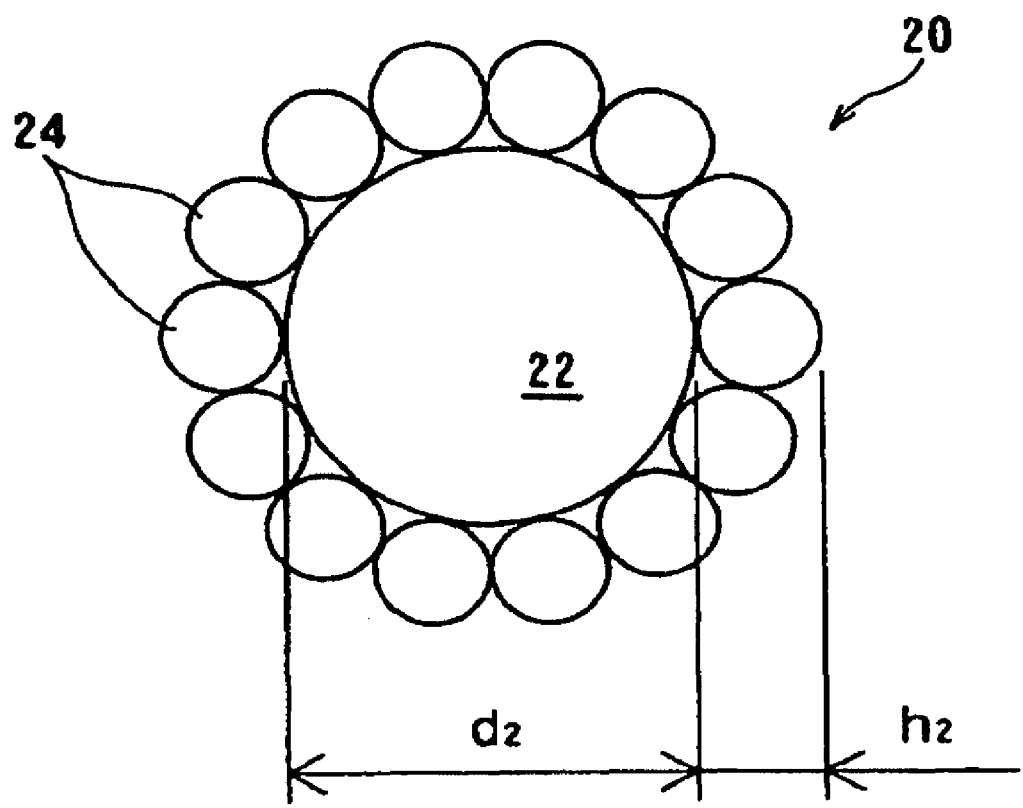
FIG. 1 is a diagram schematically illustrating a conventional composite metal nanoparticle.

In such a structure that the metal component (metal core) 12 as a core is surrounded by the organic substance 14 which is bonded to the metal component 12 by physical adsorption, the organic substance 14 is loosely bonded to the surface of the metal component 12, which is distinct from chemical bonding. Accordingly, the organic substance 14 can be separated from the surface of the metal component (metal core) 12 at a much lower temperature and with a lower energy as compared to the conventional composite metal nanoparticle 20 shown in FIG. 1, in which an organic substance is chemically and strongly bonded to a metal component (metal core) through the formation of an organometallic compound.

The thermal separation initiation temperature of the organic substance 14 of the composite nanoparticle 10 (i.e., the temperature necessary for separating the organic substance 14 from the surface of the metal component 12) is not less than 140° C. and less than 190° C. By making the thermal separation initiation temperature of the organic substance 14 (i.e., the temperature necessary for separating the organic substance 14 surrounding the core metal component 12 from the metal component 12) not less than 140° C. and less than 190° C., the bonding temperature of a bonding material, comprising the composite nanoparticles 10 as a base material, can be made about 200° C. Accordingly, solder bonding at a heating temperature (bonding temperature) of around 200° C., commonly used for semiconductor devices, electric components, etc., can be replaced with bonding utilizing the composite nanoparticles 10.

The separation energy of the organic substance 14 of the composite metal nanoparticle 10, i.e., the energy necessary for separating the inorganic substance 14 from the surface of the metal component 12, is not more than 0.3 eV per metal atom. The separation energy of the organic substance 14 is much lower than the separation energy of the organic substance 24 of the conventional composite metal nanoparticle 20 shown in FIG. 1, i.e., the energy necessary for separating the organic substance 24 from the surface of the metal component (metal core) 22.

The organic substance 14 consists of carbon (C), hydrogen (H) and oxygen (O). Thus, other elements, such as nitrogen (N) and sulfur (S), are not present in the organic substance 14 of the composite metal nanoparticle 10. The composite metal nanoparticle 10 naturally does not leave N or S in the metal portion upon separation of the inorganic substance 14 from the metal component 12, and thus is free from lowering of the conductivity of the sintered metal, produced by sintering of the metal components 12, due to N or S remaining in the sintered metal.

The metal component 12 comprises at least one of Cu, Ag, Pt, Pd, Ni, Au, Ru, and Rh. The content of the metal component 12 is preferably from 50 to 99% by weight. Further, the average particle diameter $d_1$ of the metal component (core) 12 is generally 1 to 100 nm.

The thickness $h_1$ of the coating of organic substance 14 is basically the same for various diameters $d_1$ of the metal component 12 of the composite metal nanoparticle 10. Thus, the weight ratio between the metal component 12 and the organic substance 14 varies with the diameter $d_1$ of the metal component 12. If the diameter $d_1$ of the metal component 12 is too small, because of the increased proportion of the organic substance 14, it is difficult to quickly separate the organic substance 14 from the metal component 12 in carrying out sintering. If the diameter $d_1$ of the metal component 12 is too large, on the other hand, the unique characteristics of metal nanoparticles will be instantly lost. Therefore, it becomes difficult to maintain the low-temperature sintering property that is essential for bonding. The sintering initiation temperature of the metal component 12 is known to decrease with a decrease in the particle diameter $d_1$ when the particle diameter $d_1$ is not more than 100 nm. The lowering of sintering initiation temperature is marked when the particle diameter $d_1$ is not more than 20 nm, and is remarkable when the particle diameter $d_1$ is not more than 10 nm. From an applicative viewpoint, therefore, the average particle diameter $d_1$ of the metal component (metal core) 12 is preferably 1 to 20 nm, especially preferably 5 to 15 nm.

Figure 3:
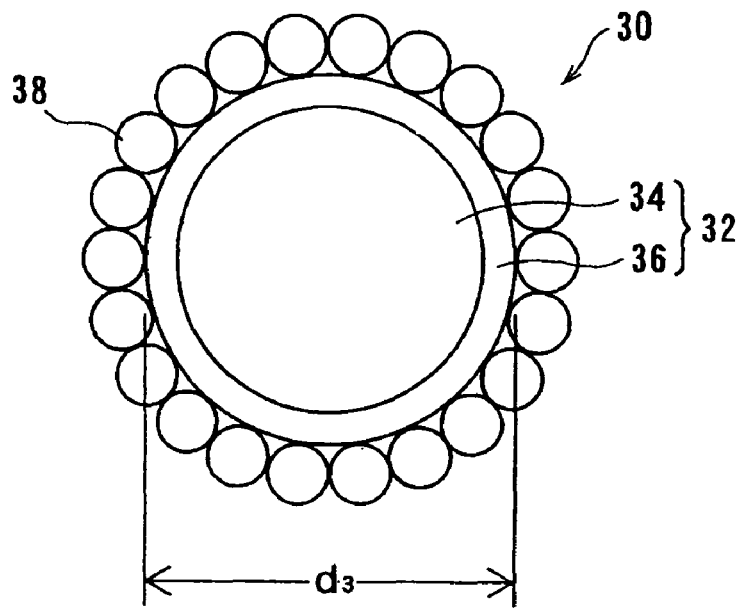
FIG. 3 is a diagram schematically illustrating a composite nanoparticle (composite inorganic metal compound nanoparticle) according to another embodiment of the present invention.

FIG. 3 schematically shows a composite nanoparticle (composite inorganic metal compound nanoparticle) according to another embodiment of the present invention. As shown in FIG. 3, the composite nanoparticle 30 comprises a core 32 composed of a metal component (metal core) 34 and an inorganic metal compound 36 surrounding the metal component 34, and an organic substance 38 surrounding the inorganic metal compound 36 and bonded to it by physical adsorption. The organic substance 38 functions as a protective coating. Owing to the organic substance 38 covering the core 32, the composite nanoparticles 30 have excellent dispersion stability with little tendency to agglomerate.

In such a structure that the inorganic metal compound 36 of the core 32 is surrounded by the organic substance 38 which is bonded to the inorganic metal compound 36 by physical adsorption, the organic substance 38 is loosely bonded to the surface of the inorganic metal compound 36, as is distinct from chemical bonding. Accordingly, the organic substance 38 can be separated from the surface of the inorganic metal compound 36 at a much lower temperature and with a lower energy as compared to the conventional composite metal nanoparticle 20 (see FIG. 1).

The thermal separation initiation temperature of the organic substance 38 of the composite nanoparticle 30 (i.e., the temperature necessary for separating the organic substance 38 from the surface of the inorganic metal compound 36) and the thermal decomposition initiation temperature of the inorganic metal compound 36 are not less than 140° C. and less than 190° C. By making the thermal separation initiation temperature of the organic substance 38 from the surface of the inorganic metal compound 36 and the thermal decomposition initiation temperature of the inorganic metal compound 36 not less than 140° C. and less than 190° C., the bonding temperature of a bonding material, comprising the composite nanoparticles 30 as a base material, can be made about 200° C.

As in the above-described embodiment, the organic substance 38 consists of carbon (C), hydrogen (H) and oxygen (O).

The inorganic metal compound 36 is an inorganic compound of a metal comprising at least one of Cu, Ag, Pt, Pd, Ni, Au, Ru, and Rh. The metal may comprise either one of these metal elements or a mixture of two or more. The inorganic metal compound 36 may include an alloy of the above metals. Though the inorganic metal compound may be in any form insofar as it thermally decomposes at a low temperature, it is preferred to use a carbonate, an oxide, or the like which will not cause the problem of residual component upon decomposition.

As in the above-described embodiment, the particle diameter $d_3$ of the core 32 of the composite nanoparticle 30 is generally not more than 100 nm, preferably 1 to 20 nm, and especially preferably 5 to 15 nm.

Figure 4:
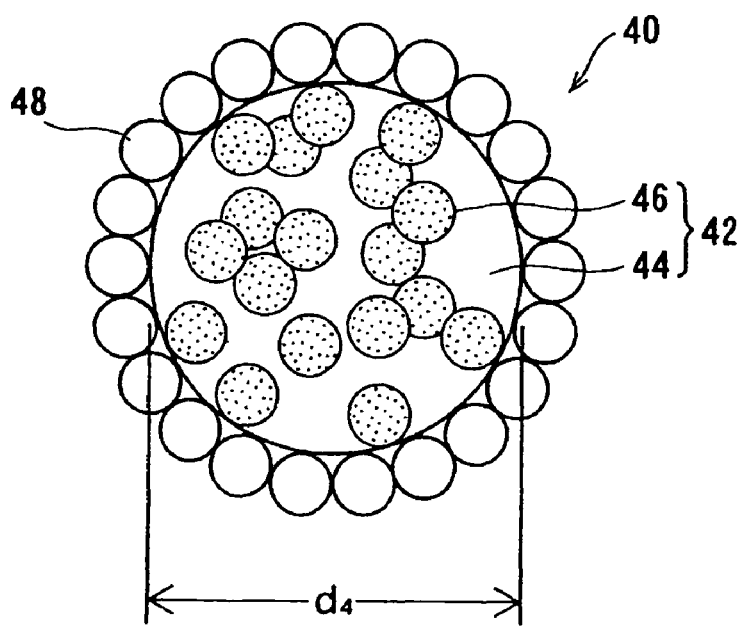
FIG. 4 is a diagram schematically illustrating a composite nanoparticle (composite inorganic metal compound nanoparticle) according to yet another embodiment of the present invention.

FIG. 4 schematically shows a composite nanoparticle (composite inorganic metal compound nanoparticle) according to yet another embodiment of the present invention. As shown in FIG. 4, the composite nanoparticle 40 comprises a core 42 composed of a mixture of a metal component 44 and an inorganic metal compound 46 dispersed in the metal compound, and an organic substance 48 surrounding the core 42 and bonded to it by physical adsorption. The organic substance 48 functions as a protective coating. Owing to the organic substance 48 covering the core 42, the composite nanoparticles 40 have excellent dispersion stability with little tendency to agglomerate.

In such a structure that the core 42, composed of the mixture of the metal component 44 and the inorganic metal compound 46, is surrounded by the organic substance 48 which is bonded to the core 42 by physical adsorption, the organic substance 48 is loosely bonded to the surfaces of the metal component 44 and the inorganic metal compound 46, which is distinct from chemical bonding. Accordingly, the organic substance 48 can be separated from the surface of the core 42 at a much lower temperature and with a lower energy as compared to the conventional composite metal nanoparticle 20.

The thermal separation initiation temperature of the organic substance 48 of the composite nanoparticle 30 (i.e., the temperature necessary for separating the organic substance 48 from the core 42) and the thermal decomposition initiation temperature of the inorganic metal compound 46 are not less than 140° C. and less than 190° C. By making the thermal separation initiation temperature of the organic substance 48 from the core 42 and the thermal decomposition initiation temperature of the inorganic metal compound 46 not less than 140° C. and less than 190° C., the bonding temperature of a bonding material, comprising the composite nanoparticles 40 as a base material, can be made about 200° C.

As in the above-described embodiments, the organic substance 48 consists of carbon (C), hydrogen (H) and oxygen (O). The inorganic metal compound 46 is an inorganic compound of a metal comprising at least one of Cu, Ag, Pt, Pd, Ni, Au, Ru, and Rh. Also as in the above-described embodiments, the particle diameter $d_4$ of the core 42 of the composite nanoparticle 40 is generally not more than 100 nm, preferably 1 to 20 nm, and especially preferably 5 to 15 nm.

Figure 5:
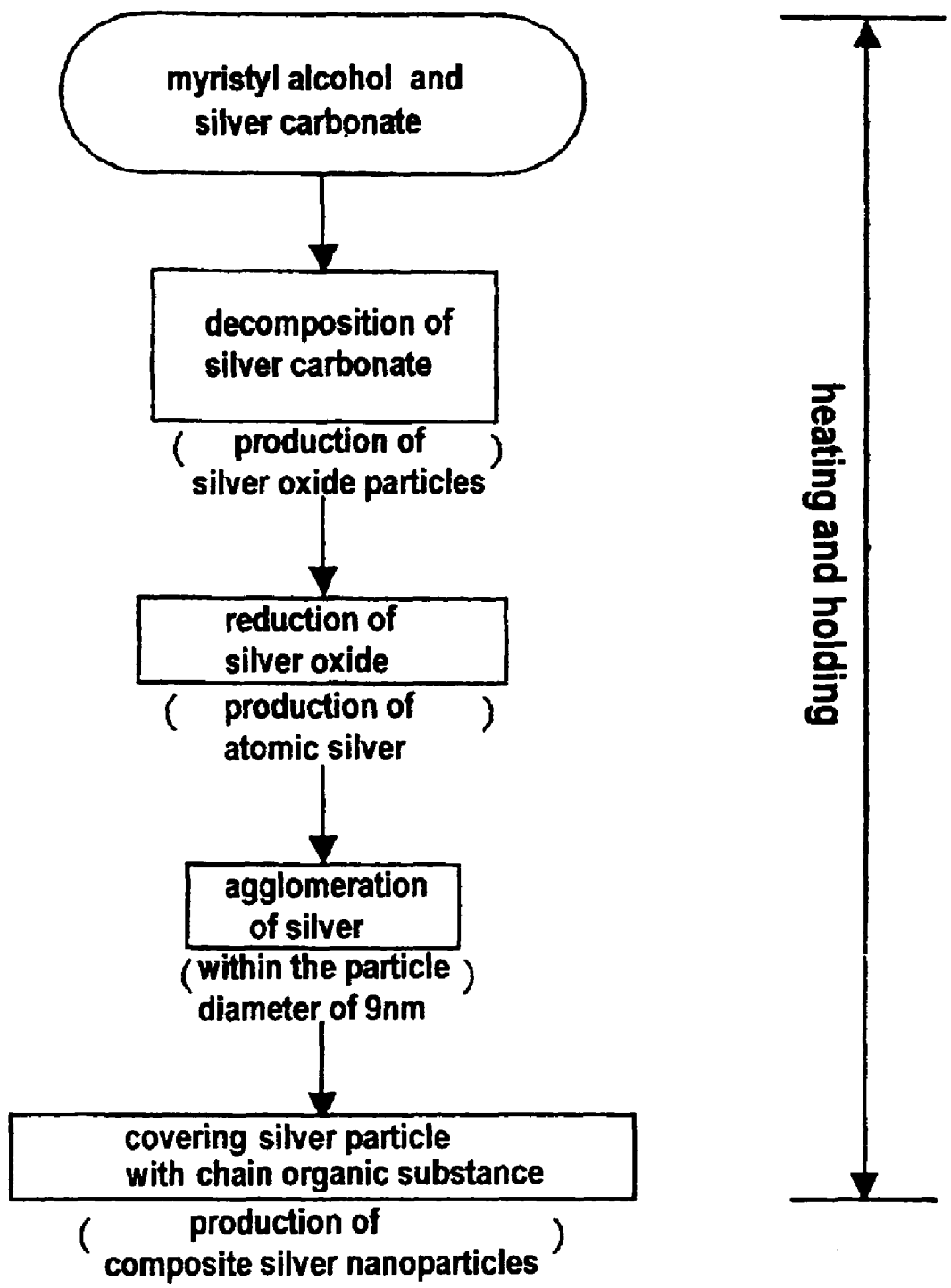
FIG. 5 is a flow chart of a model for the reaction to produce composite nanoparticles according to the present invention.

FIG. 5 shows a model for the reaction to produce the composite nanoparticles 10 according to the embodiment of the present invention shown in FIG. 2. The following description illustrates the case of producing composite nanoparticles (composite silver nanoparticles) whose metal component (metal core) is silver. Of course, the metal core need not be limited to silver; and composite metal nanoparticles having a core of a metal other than silver can be produced in a similar manner.

First, silver carbonate as a starting metal salt and myristyl alcohol as a starting organic material are mixed uniformly. Myristyl alcohol, whose melting point is 36.4° C., is solid at room temperature. The mixture of silver carbonate and myristyl alcohol is heated to a predetermined temperature, for example, a temperature of not less than 70° C. and less than 140° C. The mixture is held at the temperature for a predetermined time so that silver carbonate is decomposed to produce metal (silver) nanoparticles, and an organic substance is bonded to the metal (silver) nanoparticles by physical adsorption without forming an organometallic compound through a reaction between the metal (silver) nanoparticles and the organic substance. For example, the mixture of silver carbonate and myristyl alcohol is heated and held at 120° C. for 2 hours.

Composite nanoparticles (composite metal (silver) nanoparticles) 10 as shown in FIG. 2 are thus produced, according to this example, with the metal (silver) component 12 having an average particle diameter $d_1$ of about 9 nm and the coating of the organic substance 14 having a thickness $h_1$ of about 1.5 nm, and the organic substance 14 being bonded to the metal (silver) component 12 by physical adsorption. The mechanism of the production of composite metal (silver) nanoparticles is considered to be as follows:

<Production of Composite Metal (Silver) Nanoparticles>

Myristyl alcohol melts at 36.4° C., and silver carbonate is dispersed in the molten myristyl alcohol. When the mixture is heated, for example, at 120° C., silver carbonate is first decomposed according to the following formula (3):

$$Ag_2CO_3 \rightarrow Ag_2O + CO_2 \qquad (3)$$

The product of the reaction of formula (3) has a particulate shape of a certain size, with the starting silver carbonate ($Ag_2CO_3$) forming a core of a certain size which is surrounded by silver oxide ($Ag_2O$).

While the system is held at the heating temperature, the $Ag_2CO_3$ core sequentially splits into smaller particles with repetition of the reaction of formula (3), finally producing $Ag_2O$ in the molecular state (molecular dispersion state). Immediately thereafter, the molecular $Ag_2O$ is easily reduced to produce atomic silver (silver atom). The silver atoms agglomerate and grow into silver nanoparticles of a certain size, e.g., about 9 nm, in a short time. In this regard, silver atoms are active and thus unstable when they are dispersed in the system, and therefore are likely to agglomerate and grow into agglomerates of a certain size. Further in this regard, because of constant evaporation of myristyl alcohol by heating of the system, the silver concentration in the system increases with time, resulting in an excessively high silver concentration, i.e., supersaturation of silver. This inevitably causes uniform formation of cores in the system. This phenomenon is considered to resemble the uniform formation of solidified metal cores in a molten metal during cooling of the system.

A particulate core of a certain size is formed by agglomeration of a certain number of silver atoms. After the core size has come to a certain critical value, the cores continue to agglomerate and grow stably in a thermally-activated process into metal (silver) nanoparticles having an equilibrium size (e.g., 9 nm).

Agglomeration of silver particles occurs to decrease the total surface energy in the whole system. When silver particles grow through agglomeration to a certain size, their growth stops due to the action of an organic substance existing around the silver nanoparticles and the silver nanoparticles come to be covered with the organic substance. Agglomeration and coalescence of silver atoms or silver particles thus stops, and composite silver nanoparticles, dispersed independently in myristyl alcohol, are produced.

In particular, when the metal surfaces of nanoparticles are exposed, agglomeration of nanoparticles initiates instantly and progresses at a high speed due to the huge surface energy of the surfaces of nanoparticles. When the nanoparticles grow to a certain size, the relative growth rate decreases (stable growth) and the interaction with a surrounding organic substance becomes stronger, whereby the surfaces of the metal nanoparticles come to be covered and protected with the organic substance. The thus-produced composite silver nanoparticles exist in myristyl alcohol in the form of discrete and dispersed particles.

<Temperature Dependency of the Growth of Particles>

The relationship between the heating temperature and the growth of particles will now be considered. The frequency of generation of the cores of metal (silver) particles increases with an increase in the heating temperature. Thus, at a higher heating temperature, generation of cores occurs at more places and a larger number of cores are produced. Since each of the cores grows while taking in surrounding atomic silver, the atomic silver surrounding each core decreases and runs out promptly whereby the growth of silver particles stops promptly, providing silver nanoparticles of relatively small size. Since the growth starts from a smaller core, the particle size after growth is also smaller as compared to at a lower heating temperature.

Figure 6:
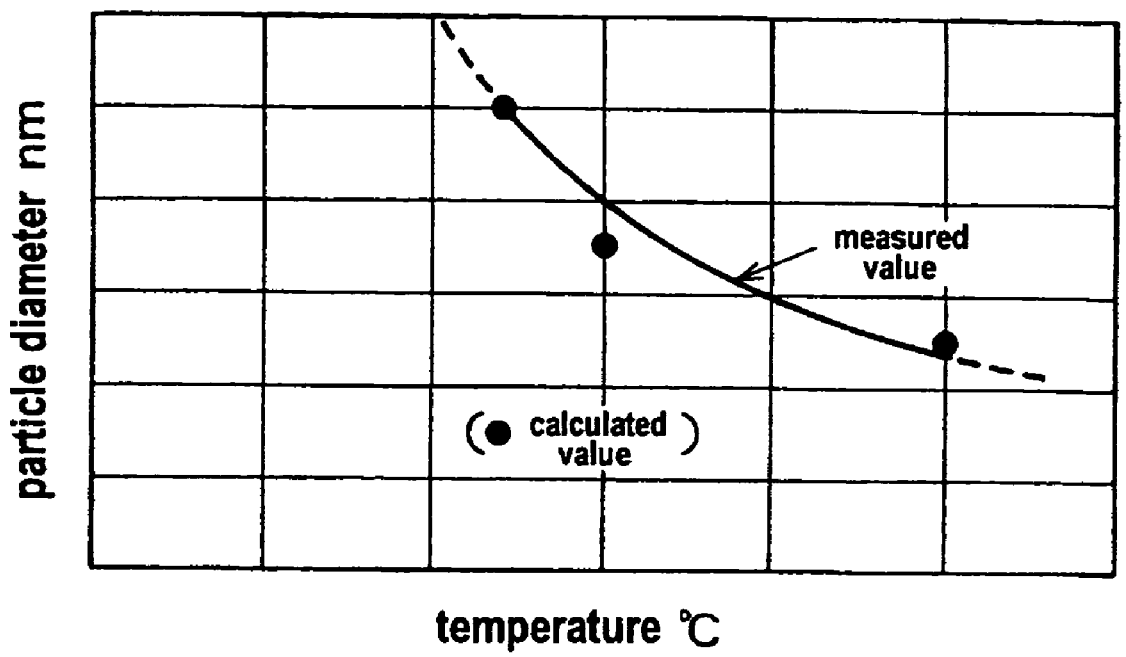
FIG. 6 is a graphical diagram showing the correlation between the temperature for production of nanoparticles and the particle diameter (average value) in terms both of measured value and calculated value according to the Arrhenius law.

In contrast, the frequency of generation of the cores of particles is low and the number of the cores generated in the system is relatively small when the system is heated and held at a low temperature. Accordingly, the fewer cores take in a large quantity of surrounding atomic silver. Thus, each silver particle can grow to a large size. The above phenomenon is illustrated in FIG. 6 which shows the correlation between the temperature upon production of nanoparticles and the particle diameter (average value) in terms both of measured value and calculated value according to the Arrhenius law.

As described above, the particle diameter of metal particles as produced by the above method is smaller at a higher heating and holding temperature. This coincides with the fact that the mechanism of generation and growth of metal cores from metal atoms is based on a thermally-activated process.

A particular particle diameter of particles for actual use must be determined according to the application field and the intended usage of the particles. For example, when the use of the present particles as a catalyst is intended, the smallest possible particle diameter is desirable because the catalytic effect is higher when the total surface area of the catalyst particles used is larger. In the case of using the present particles as a bonding material, on the other hand, the shell of organic substance needs to be decomposed and removed efficiently upon bonding. Prompt metal sintering is thus necessary, and the use of an excessively small particle size is not suited for that purpose. This is because decomposition and release of the organic substance necessitates bonding of the organic substance with oxygen which reacts with it, and it is essential to secure adequate flow passages for supplying oxygen and diffusing the gas produced by the reaction. With particles having an excessively small particle size, the gaps in the particles are so small as to make passage of gas difficult. A proper particle size should therefore be selected.

<Behavior of Organic Protective Coating>

As described above, the growth of the metal (silver) particles stops when the particles have come to be covered and protected with an organic substance. The organic substance has a straight-chain structure of C—H—O and is bonded to the metal particles by physical adsorption. Thus, according to this embodiment, the composite nanoparticles (composite metal (silver) nanoparticles) 10 shown in FIG. 2, each particle comprising the metal (silver) component 12 and the organic substance 14 surrounding the metal component 12 and bonded to it by physical adsorption, can be produced, for example, by heating and holding the mixture of silver carbonate and myristyl alcohol at 120° C. for 2 hours.

Figure 7:
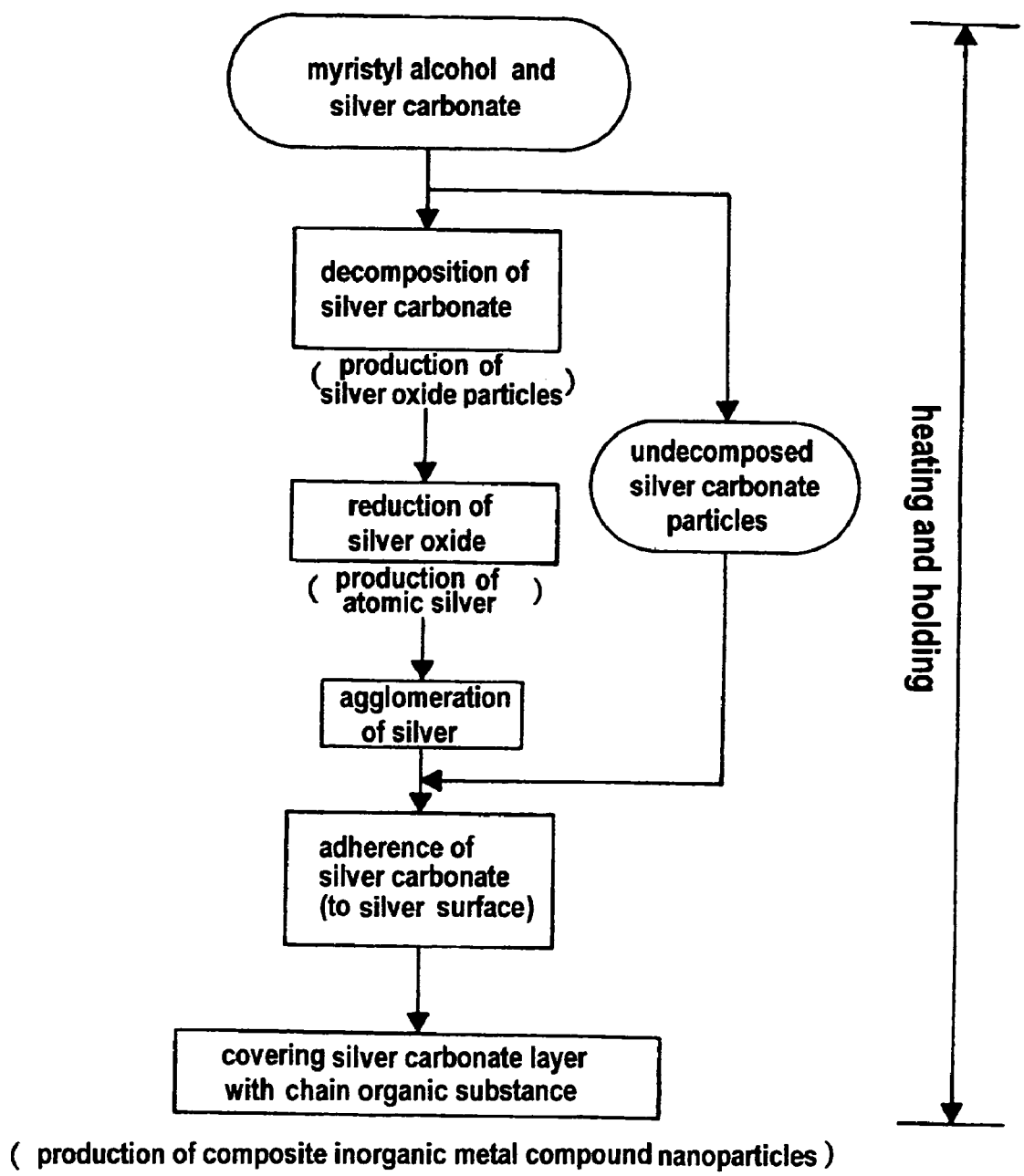
FIG. 7 is a flow chart of another model for the reaction to produce composite nanoparticles according to the present invention.

The composite nanoparticles (composite metal (silver) nanoparticles) 10 are produced when silver carbonate is completely decomposed. On the other hand, agglomeration of silver particles can occur in the course of the decomposition of silver carbonate depending on the process conditions. In this case, undecomposed silver carbonate particles adhere to silver particles, as shown in FIG. 7, producing the composite nanoparticles (composite inorganic metal compound nanoparticles) 30 shown in FIG. 3, each particle comprising the core 32 composed of the metal component (metal core) 34 and the inorganic metal compound 36 surrounding the metal component 34, and the organic substance 38 surrounding the inorganic metal compound 36 and bonded to it by physical adsorption.

As will be appreciated from the above, composite nanoparticles (composite inorganic metal compound nanoparticles), each particle comprising a core, comprising at least an inorganic metal compound, and an organic substance surrounding the core and bonded to the core by physical adsorption, not by chemical bonding, can be produced by allowing an inorganic metal salt and an organic material to coexist. The inorganic metal salt and the organic material are heated to a predetermined temperature and held at the temperature for a predetermined time so that an organic material is bonded by physical adsorption to the cores. The core comprises the inorganic metal salt or an inorganic metal compound produced by thermal decomposition of the inorganic metal salt, without forming an organometallic compound through a reaction between the organic material and at least part of the inorganic metal salt.

In contrast thereto, when the mixture of silver carbonate and myristyl alcohol is heated at a high temperature, e.g., 140° C., and held at the temperature for 2 hours, the organic substance changes gradually. In particular, it is considered that though the organic substance initially has a straight-chain structure of C—H—O, as described above, interaction between the organic substance and the metal will progress while the system is heated at the temperature higher than a predetermined temperature for the time not shorter than a predetermined time, whereby an organometallic compound comes to exist predominantly. The organic substance, which has been physically adsorbed onto the metal cores, thus changes into an organometallic compound.

Thus, an organometallic compound is not formed and the organic substance is kept bonded to the metal component by weak physical adsorption when the mixture of silver carbonate and myristyl alcohol is heated and held at 120° C. for 2 hours. In contrast, when the mixture is heated and held at 140° C. for 2 hours, the metal reacts with the adsorbed organic substance to form an organometallic compound, producing composite metal nanoparticles having a coating of a complicated structure. By the above mechanism, the heating/holding of 120° C.×2 h and the heating/holding of 140° C.×2 h produce the very different types of composite metal nanoparticles.

Figure 8A:
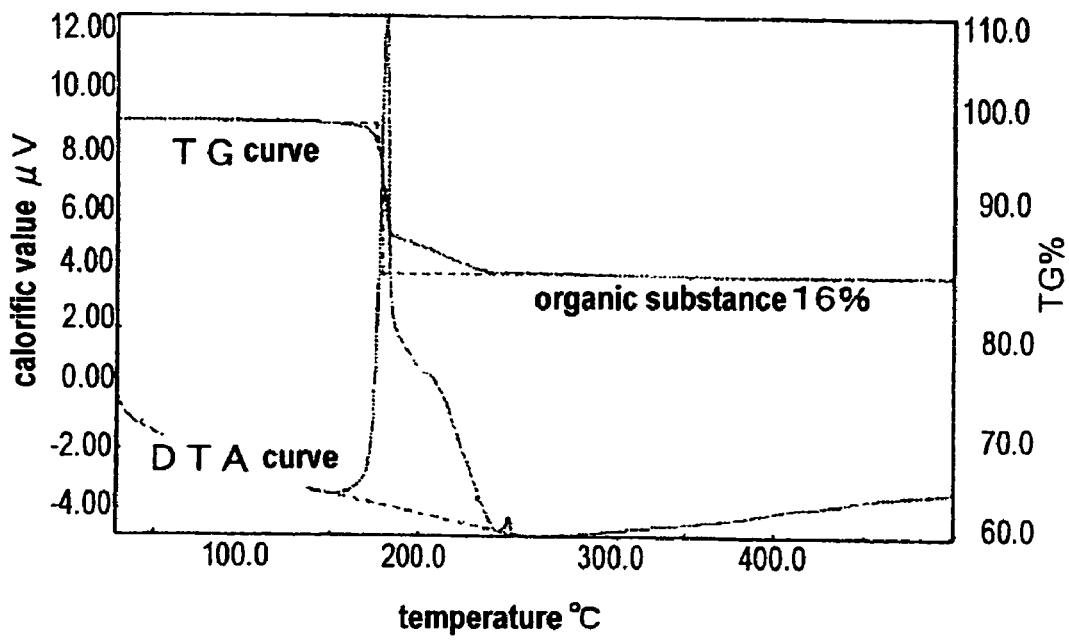
FIG. 8A is a graphical diagram showing thermal analysis curves (DTA curve and TG curve) for a composite nanoparticle according to the present invention.
Figure 8B:
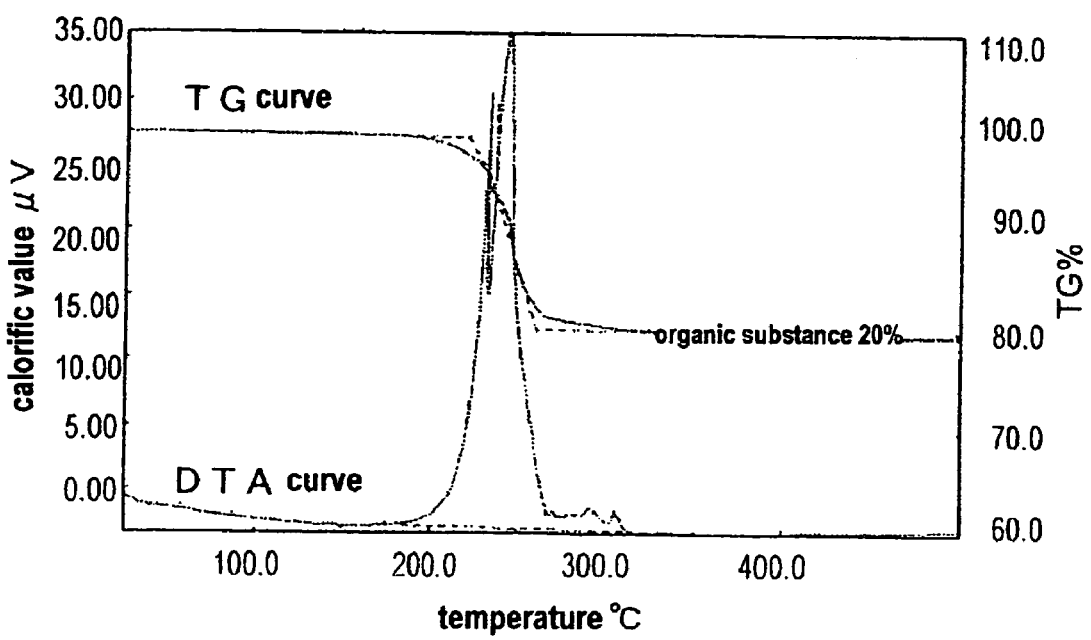
FIG. 8B is a graphical diagram showing thermal analysis curves (DTA curve and TG curve) for a comparative composite metal (silver) nanoparticle.

FIGS. 8A and 8B show pyrolysis curves (DTA curve and TG curve) for the composite silver nanoparticle according to the present invention, produced by the heating/holding of 120° C.×2 h, and for the comparative composite nanoparticle, produced by the heating/holding of 140° C.×2 h. For the pyrolysis curves shown in FIGS. 8A and 8B, the rate of temperature increase is 5° C./min.

With respect to the DTA curves shown in FIGS. 8A and 8B, the peak (exothermic reaction) appears at about 180° C. for the composite nanoparticle according to the present invention, as shown in FIG. 8A, while the peak appears at about 220° C. for the comparative composite nanoparticle, as shown in FIG. 8B. The separation of the organic substance from the surface of the metal component (metal core) and/or the decomposition of the organic substance is considered to occur around the peak temperatures. The peak temperature for the composite nanoparticle according to the present invention is lower by about 40° C. than the peak temperature for the comparative composite nanoparticle. Further, the peak is sharp for the former nanoparticle, whereas the peak is relatively broad for the latter nanoparticle.

As will be understood from the above, in the composite nanoparticle of the present invention, produced by the heating/holding of 120° C.×2 h, the organic substance is decomposed and vaporized, and separated from the silver component (silver core) at a much lower temperature as compared to the comparative composite nanoparticle produced by the heating/holding of 140° C.×2 h. Further, the separation energy of the organic substance, i.e., the energy necessary for separating the organic substance from the silver component, of the composite nanoparticle according to the present invention is as low as 0.3 eV per silver atom, which is about ⅛ of the separation energy of the conventional composite nanoparticle. In addition, the composite nanoparticle of the present invention has high uniformity of the particle characteristic (the sharp peak of the curve), which is very advantageous to bonding utilizing the low-temperature sintering property of the composite silver nanoparticles.

With respect to the TG curves, the data in FIG. 8A for the composite nanoparticle according to the present invention shows a very rapid, and much more rapid weight decrease as compared to the data in FIG. 8B for the comparative composite nanoparticle, indicating rapid separation of the organic substance in the former nanoparticle. This shows that the composite silver nanoparticles according to the present invention have high uniformity of particle characteristics, including the particle diameter, and that the separation of the organic substance initiates concurrently in almost all of the particles at the moment when the temperature of the system has reached a certain temperature. In contrast, as demonstrated by the comparative data, the uniformity of particle characteristics of the comparative composite silver nanoparticles is lower, and it takes extra time for all the inorganic substance to initiate separation from the metal component (metal core). In view of the fact that prompt separation of an organic substance from a metal component (metal core) is essential for uniform metal sintering, the composite silver nanoparticles of the present invention are considered to eliminate disadvantages in applying the comparative composite silver nanoparticles to bonding and to be suitably applied to bonding.

Figure 9:
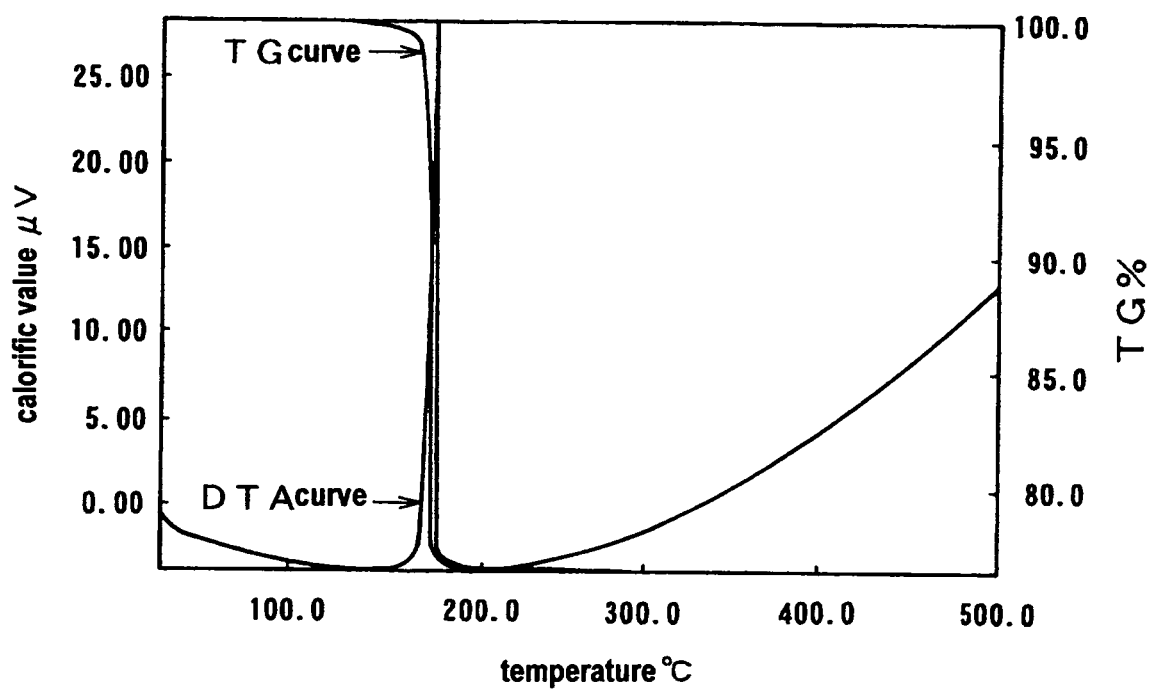
FIG. 9 is a graphical diagram showing thermal analysis curves for another composite nanoparticle according to the present invention.

The pyrolysis curves shown in FIG. 8A is for the composite nanoparticle as produced under the heating/holding conditions of 120° C.×2 h and at an ordinary temperature control level, i.e., with a control deviation of within ±0.5° C. for the holding temperature. FIG. 9 shows pyrolysis curves for the composite nanoparticle as produced under the heating/holding conditions 120° C.×2 h and at a temperature control level of within ±0.1° C. of control deviation, which is far stricter than the ordinary temperature control level.

As is apparent from FIG. 9, though the peak temperature of the DTA curve, which is about 178° C., is almost the same as that of FIG. 8A, the peak of the curve is considerably narrower and, in addition, the change in the TG curve at that temperature is much more rapid. This is considered to be due to the very high uniformity of the particle characteristics of the composite nanoparticle produced under the strict control of the holding temperature. The composite nanoparticles are therefore suited for application to high-quality bonding.

Figure 10:
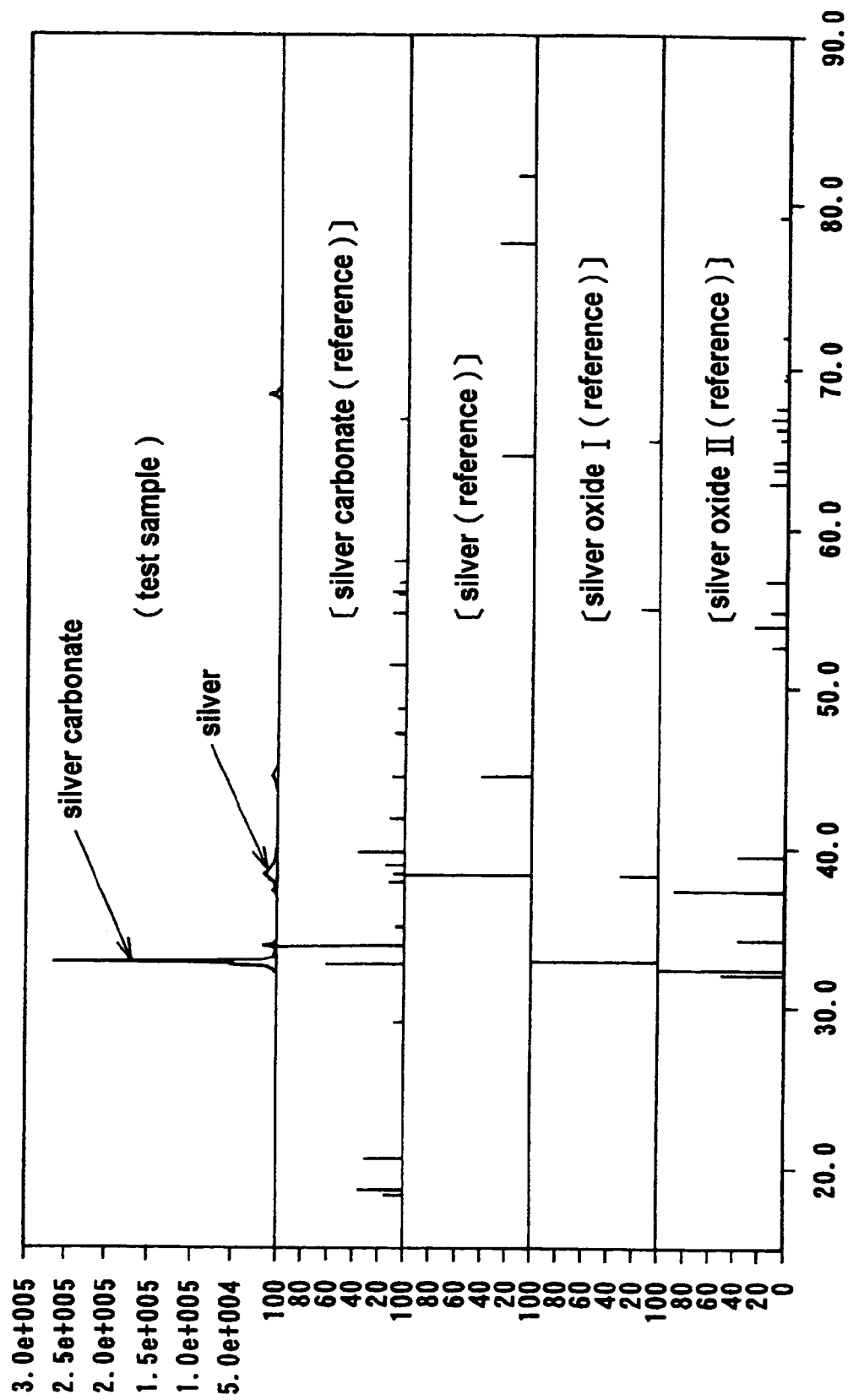
FIG. 10 is a spectrum diagram as obtained by qualitative analysis/identification by X-ray diffractometry of the constituents of a composite nanoparticle according to the present invention.

FIG. 10 shows a spectrum as obtained by qualitative analysis/identification by X-ray diffractometry of the constituents of a composite nanoparticle (test sample) which, as with the composite nanoparticle shown in FIG. 9, is produced under the heating/holding conditions of 120° C.×2 h and under temperature control such that the control deviation is within ±0.1° C. As can be seen from the data in FIG. 10, this composite nanoparticle has the form of a composite inorganic metal compound nanoparticle comprising at least silver carbonate and metallic silver.

Due to a difference in energy level, detection of an organic substance is impossible with X-ray diffractometry.

Figure 11:
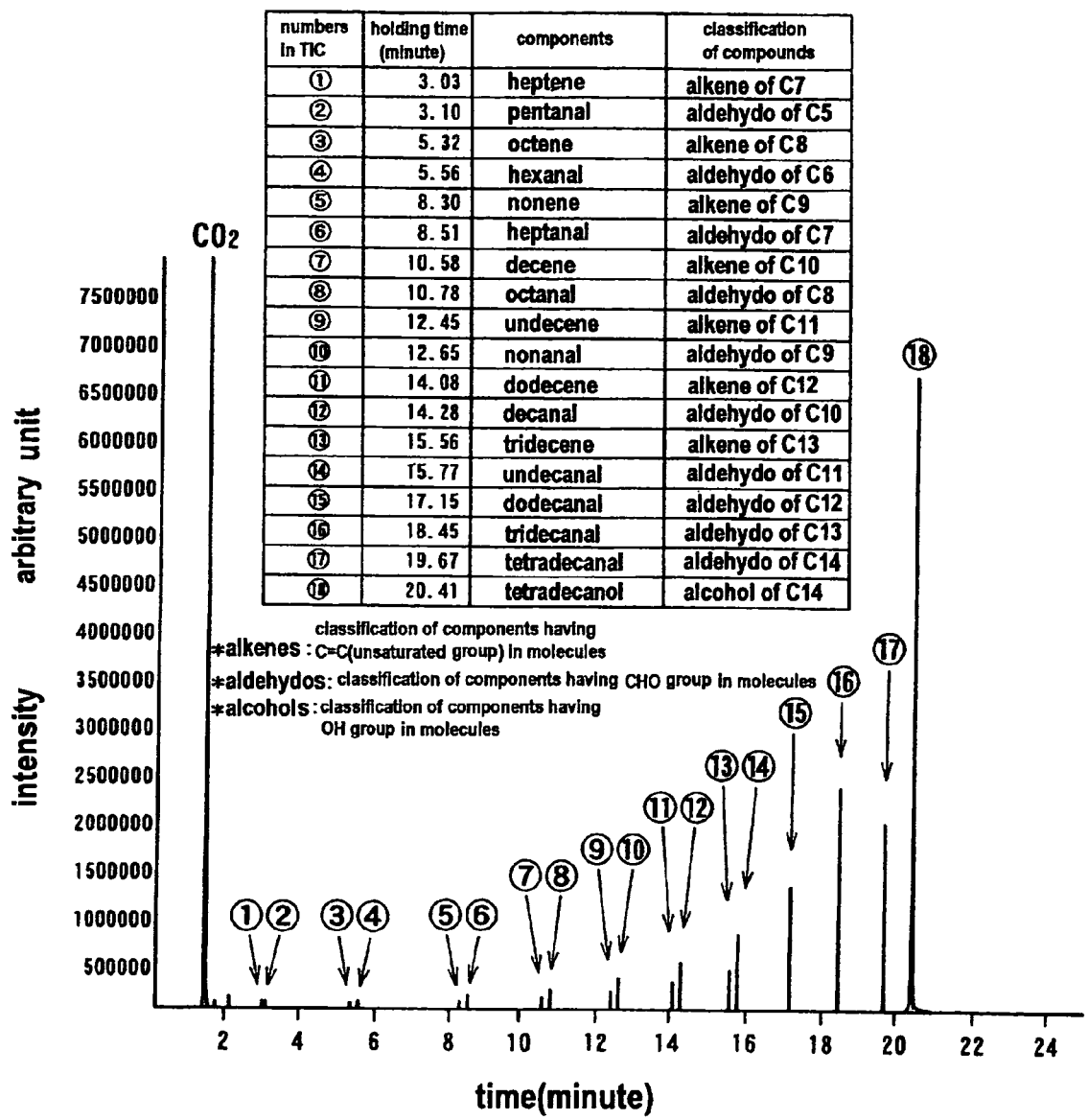
FIG. 11 is a spectrum diagram as obtained by GC (gas chromatography)-mass spectrometry/identification of the composite nanoparticle (test sample) according to the present invention.

In order to examine the organic substance layer of this composite nanoparticle (composite inorganic metal compound nanoparticle), the sample was subjected to GC (gas chromatography)-mass spectrometry/identification. FIG. 11 shows the results of the analysis. As is apparent from FIG. 11, the main component of the organic substance is alcohol, having 14 carbon atoms in the molecule, tetradecanol.

Tetradecanol (other name of myristyl alcohol) accounts for about 60 wt % of the whole organic substance and is considered to be derived from the starting myristyl alcohol.

A difference in dispersibility in an organic material can be pointed out as another significant difference between the composite nanoparticles of the present invention and the conventional composite nanoparticles. In particular, the comparative composite nanoparticles can be uniformly dispersed in a solvent, such as toluene, whereas the composite nanoparticles of the present invention are characterized by their being not dispersible in an organic solvent. The composite metal nanoparticles of the present invention, however, can be dispersed in water containing a surfactant.

<Temperature×Time Effect>

As described hereinabove, with the same holding time of 2 hours, the heating/holding temperatures of 120° C. (present invention) and 140° C. (comparison) produce composite silver nanoparticles having completely different properties. This is considered to be primarily due to the essential difference in the form of the coating of the organic substance surrounding the metal core. The temperature difference of only 20° C. produces a significant difference in the rate of the chemical reaction, resulting in the significant differences in the properties of the products. This may be explained by the fact that the formation of the organic coating is based on a thermally-activated process and most of the time for the production of composite nanoparticles as shown in FIG. 5 is spent on the formation/change of the organic coating (adsorption, formation of organometallic compound, etc.).

A temperature/time parameter (Larson-Miller parameter $\lambda$), quantitatively indicating the effect of a thermally-activated process, can be calculated by the following formula (4). The results of calculation are shown in Table 2 below. With respect to a phenomenon based on a thermally-activated process, typically exemplified by diffusion of atoms, the degree of the progress of a reaction is known to be indicated by a parameter in the form of $T_1$ (C+log t). There is a general law that with the same parameter value, the same nature or state of system is reached. The Larson-Miller parameter $\lambda$ of the formula (4) is therefore commonly used as an index of the degree of a thermally-activated reaction.

$$\lambda = T_1(20 + \log t) \times 10^{-3} \quad (4)$$

[$T_1$: heating temperature (K), t: holding time (h)]

TABLE 2

| Heating temp. (° C.) | Holding time (h) | $\lambda$ |
| --- | --- | --- |
| 100 | 14 | 7.98 |
| 120 | 2 | 7.98 |
| 140 | 2 | 8.38 |

As shown in Table 2, the heating/holding of 100° C.×14 h and the heating/holding of 120° C.×2 h both give the same $\lambda$ (Larson-Miller parameter) value of 7.98, whereas the heating/holding of 140° C.×2 h gives the considerably higher $\lambda$ value of 8.38. The formation of the organometallic compound is considered to be due to the heating temperature/holding time effect.

In particular, though products belonging to the same category of composite nanoparticles are produced, an organometallic compound is not formed when the $\lambda$ value is not more than 7.98 (120° C.×2 h, 100° C.×14 h), whereas an organometallic compound forming reaction occurs when the system undergoes a heat history corresponding to the $\lambda$ value of at least 8.38 (140° C.×2 h). This difference produces the above-described significant differences in the particle properties. The Larson-Miller parameter is thus closely related to the formation of organometallic compound.

In the formula (4) C numeral 20 is used as a constant, which is commonly used for high-temperature deformation of a metal, because of the fact that the metal deformation and the formation of an organometallic compound are both based on diffusion of atoms as an elementary process.

Taking account of the above-described conditions under which the organometallic compound forming reaction will occur, it is necessary to carry out heating and holding in such a manner that the Larson-Miller parameter $\lambda$ is not more than 7.98 in order to obtain composite silver nanoparticles having the desired properties. From a practical viewpoint, the heating processing (heating and holding) is preferably carried out, e.g., at 120° C. for 2 hours. The use of a heating temperature higher than 120° C. increases the speed of the progress of the phenomenon and thus increases the risk of the formation of an organometallic compound.

On the other hand, as is apparent from Table 2, the use of such a low heating temperature as 100° C. necessitates a remarkably longer holding time. Because of the prolonged production time, the production process is likely to be uneconomical. It is therefore desirable to select a practicable heating temperature and holding time in the heating time range of about 80 to 120° C. and in the holding time range of about 1 to 24 hours while satisfying such heating/holding conditions as to make the Larson-Miller parameter $\lambda$ not more than 7.98.

Table 3 shows the production conditions and the indicated property for the above-described composite silver nanoparticles produced by heating and holding the mixture of silver carbonate and myristyl alcohol at 120° C. for 2 hours (present invention), the above-described composite silver nanoparticles produced by heating and holding the same mixture at 140° C. for 2 hours (Comp. Example 1), and composite silver nanoparticles produced by heating silver stearate as a starting material at 250° C. in a nitrogen gas atmosphere (Comp. Example 2). Table 3 also shows the bonding initiation temperature of a bonding material comprising each of these nanoparticles as a base material.

TABLE 3

| | Method | | |
| --- | --- | --- | --- |
| Conditions/Properties | The present Invention | Comp. Example 1 | Comp. Example 2 |
| Starting material | silver carbonate + myristyl alcohol | silver carbonate + myristyl alcohol | silver stearate |
| Heating temp. × time (atmosphere) | 120° C. × 2 h (atmospheric) | 140° C. × 2 h (reflux/inert atmosphere preferred) | 250° C. × 2 h ($N_2$) |

TABLE 3-continued

| | Method | | |
|---|---|---|---|
| Conditions/Properties | The present Invention | Comp. Example 1 | Comp. Example 2 |
| *Thermal separation initiation temp. of organic substance | 140-190° C. | 180-230° C. | 200-250° C. |
| Bonding initiation temp. | 200° C.- | 250° C.- | 250° C.- |

*Measured by thermal analysis at a temperature increase rate of 1° C./min

As can be seen from comparison of the data for the present invention with the data for Comp. Example 1, the difference of only 20° C. in the heating temperature upon production of the composite nanoparticles produces significant differences in the thermal separation temperature of organic substance and in the bonding initiation temperature, and the comparative data clearly demonstrates the superiority of the composite silver nanoparticles according to the present invention.

Table 4 shows comparative data between various composite silver nanoparticles according to the present invention, as produced with various heating temperatures and heating times.

TABLE 4

| | Temp. (° C.)* | | |
|---|---|---|---|
| | 100 | 120 | 140 |
| Time (h)* | 11 | 1 | 0.11 |
| Thermal separation initiation temp. of Organic substance (° C.) | | ≈180 | |

*Larson-Miller parameter λ = 7.85

The production conditions indicated in Table 4 for the respective composite nanoparticles all give the same Larson-Miller parameter λ value of 7.85. As shown in FIG. 4, the thermal separation initiation temperature of organic substance is about 180° C. mutually for all the composite nanoparticles tested. This demonstrates the fact that the same form of particles are provided even with different heating temperatures and holding times upon their production insofar as the Larson-Miller parameter λ is the same.

Figure 12:
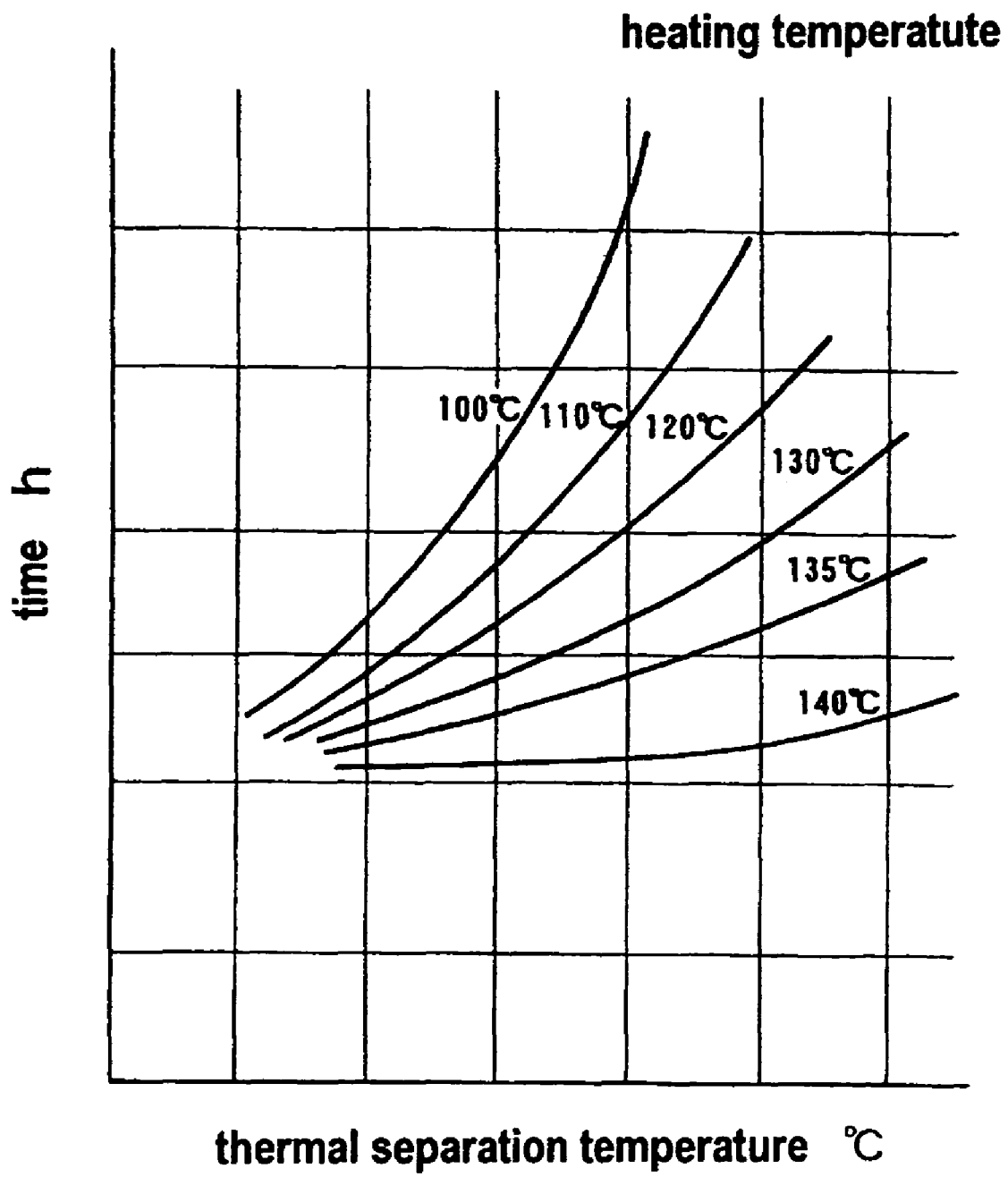
FIG. 12 is a graphical diagram showing the relationship between heating temperature/holding time upon the production of composite nanoparticles according to the present invention and the thermal separation temperature of organic substance.

FIG. 12 shows how the thermal separation temperature of the organic substance changes with the heating temperature and the holding time upon the production of composite nanoparticles according to the present invention. FIG. 12 is prepared by plotting in the abscissa temperature values corresponding to the first peaks of thermal analysis curves (TG curves).

The data in FIG. 12 enables quantitative estimation of the influence of the heating temperature and the holding time on the separation of the organic substance from the metal core.

INDUSTRIAL APPLICABILITY

The composite nanoparticles of the present invention can be utilized as a base material of a bonding material, e.g., for bonding electrodes of a semiconductor device.

The invention claimed is:

1. A composite nanoparticle comprising:
 a core comprising an inorganic metal compound and a metal component; and
 a coating of an organic substance bonded to said core by physical adsorption.

2. The composite nanoparticle of claim 1, wherein said inorganic metal compound is an inorganic compound of a metal comprising at least one of Cu, Ag, Pt, Pd, Ni, Au, Ru, and Rh.

3. The composite nanoparticle of claim 1, wherein a content of said metal component is 50% to 99% by weight of a total weight of said composite nanoparticle.

4. The composite nanoparticle of claim 1, wherein an average particle diameter of said core is 1 nm to 100 nm.

5. The composite nanoparticle of claim 4, wherein said average particle diameter of said core is 5 nm to 15 nm.

6. The composite nanoparticle of claim 1, wherein said organic substance has a thermal separation initiation temperature of not less than 140° C. and less than 190° C.

7. The composite nanoparticle of claim 1, wherein said organic substance has a separation energy of not more than 0.3 eV per metal atom.

8. The composite nanoparticle of claim 1, wherein said inorganic metal compound is silver carbonate and said metal component is metallic silver.

9. The composite nanoparticle of claim 8, wherein said organic substance is derived from myristyl alcohol.

10. The composite nanoparticle of claim 9, wherein said core and said coating are formed by heating and holding co-existing silver carbonate and myristyl alcohol such that the following relationship is met, wherein T (° C.) represents the heating temperature, and t (h) represents the holding time at temperature T, so that said organic substance is bonded to said core without forming an organometallic compound through a reaction between silver and said organic substance:

$$7.85 \leq (T+273)(20+\log t) \times 10^{-3} \leq 7.98.$$

11. The composite nanoparticle of claim 1, wherein said organic substance is derived from myristyl alcohol.

12. The composite nanoparticle of claim 1, wherein said inorganic metal compound of said core surrounds said metal component.

13. The composite nanoparticle of claim 1, wherein said inorganic metal compound of said core is dispersed within said metal component.

* * * * *